United States Patent
Rico Alvarino et al.

(10) Patent No.: US 10,405,299 B2
(45) Date of Patent: Sep. 3, 2019

(54) REFERENCE SIGNAL TRANSMISSION BASED ON RECEIVED SIGNAL QUALITY

(71) Applicant: QUALCOMM Incorporated, San Diego, CA (US)

(72) Inventors: Alberto Rico Alvarino, San Diego, CA (US); Wanshi Chen, San Diego, CA (US); Hao Xu, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 15/471,658

(22) Filed: Mar. 28, 2017

(65) Prior Publication Data
US 2018/0077683 A1    Mar. 15, 2018

Related U.S. Application Data

(60) Provisional application No. 62/394,550, filed on Sep. 14, 2016.

(51) Int. Cl.
| | |
|---|---|
| *H04W 72/02* | (2009.01) |
| *H04B 7/0404* | (2017.01) |
| *H04L 5/00* | (2006.01) |
| *H04W 52/24* | (2009.01) |
| *H04W 72/08* | (2009.01) |
| *H04B 7/06* | (2006.01) |
| *H04B 7/08* | (2006.01) |

(52) U.S. Cl.
CPC .......... *H04W 72/02* (2013.01); *H04B 7/0404* (2013.01); *H04B 7/0608* (2013.01); *H04B 7/0691* (2013.01); *H04B 7/0874* (2013.01); *H04L 5/0023* (2013.01); *H04L 5/0048* (2013.01); *H04L 5/0051* (2013.01); *H04W 52/241* (2013.01); *H04W 72/085* (2013.01)

(58) Field of Classification Search
CPC ... H04L 5/0051; H04L 5/0048; H04L 5/0023; H04W 52/241; H04W 72/02; H04W 72/085; H04B 7/0874; H04B 7/0691; H04B 7/0404; H04B 7/0608
See application file for complete search history.

(56) References Cited

U.S. PATENT DOCUMENTS

| | | | |
|---|---|---|---|
| 6,330,433 B1 * | 12/2001 | Jager | H04B 7/0808 455/135 |
| 2007/0254655 A1 | 11/2007 | Tujkovic et al. | |
| 2010/0002649 A1 | 1/2010 | Teo et al. | |

(Continued)

OTHER PUBLICATIONS

ISA/EPO, Partial International Search Report of the International Searching Authority, Int'l App. No. PCT/US2017/049703, dated Nov. 16, 2017, European Patent Office, Rijswijk, NL, 13 pgs.

(Continued)

*Primary Examiner* — Ricardo H Castaneyra
(74) *Attorney, Agent, or Firm* — Holland & Hart LLP

(57) ABSTRACT

Methods, systems, and devices for wireless communication are described. A user equipment (UE) may determine that a reference signal (RS) transmission has been triggered. The UE may select a subset of antennas from a set of available antennas based on a signal property associated with each antenna of the subset of antennas. The UE may transmit the RS using the selected subset of antennas.

30 Claims, 11 Drawing Sheets

(56) References Cited

U.S. PATENT DOCUMENTS

| | | | |
|---|---|---|---|
| 2012/0231788 A1* | 9/2012 | Kaminski | H01Q 1/246 |
| | | | 455/431 |
| 2012/0327876 A1* | 12/2012 | Ouchi | H04B 1/713 |
| | | | 370/329 |
| 2013/0225223 A1 | 8/2013 | Nukala et al. | |
| 2014/0219377 A1 | 8/2014 | Guey et al. | |
| 2015/0016489 A1 | 1/2015 | Mehta et al. | |

OTHER PUBLICATIONS

International Search Report and Written Opinion—PCT/US2017/049703—ISA/EPO—dated Mar. 16, 2018.

* cited by examiner

REFERENCE SIGNAL TRANSMISSION BASED ON RECEIVED SIGNAL QUALITY

CROSS REFERENCES

The present application for patent claims priority to U.S. Provisional Patent Application No. 62/394,550 by Rico Alvarino, et al., entitled "REFERENCE SIGNAL TRANSMISSION BASED ON RECEIVED SIGNAL QUALITY," filed Sep. 14, 2016, assigned to the assignee hereof.

BACKGROUND

The following relates generally to wireless communications, and more specifically to reference signal transmission based on received signal quality.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communication system may include a number of base stations, each simultaneously supporting communication for multiple communication devices, which may be otherwise known as user equipment (UE).

Wireless communication systems conventionally rely on various reference signals (RSs) to determine various channel conditions. Examples of RSs may include, but are not limited to, cell specific RSs, UE specific RSs, positioning RSs, channel state information (CSI) RSs, sounding RSs (SRSs), and the like. The RSs may be transmitted by a UE and used by the base station to determine uplink channel quality and/or transmitted by the base station and used by the UE to determine downlink channel quality. Additionally, base stations often allocate a partial section of the available bandwidth for a particular UE at a particular time. Therefore, the RSs may provide an indication of the channel quality for the uplink and/or downlink path for each frequency region (e.g., each channel, tone, bin, etc.).

Conventional techniques may include the base station controlling the RS transmissions of the UE. In one non-limiting example, SRS transmissions from the UE may be controlled by the base station or evolved NodeB (eNB). Depending on the UE capability, the base station may trigger the SRS transmission from a single UE antenna or from multiple antennas of the UE. Multiple antennas may be sounded (e.g., used for SRS transmission) simultaneously (e.g., in a multiple-input/multiple-output (MIMO) mode) or one at a time (e.g., using transmission antenna switching). Such conventional techniques, however, may not provide an opportunity for the UE to provide input regarding which antennas are used for SRS transmission.

SUMMARY

The described techniques relate to improved methods, systems, devices, or apparatuses that support reference signal transmission based on received signal quality. Generally, the described techniques provide for a user equipment (UE) to select antennas for reference signal (RS) transmission based on a signal property associated with the antennas. For example, the UE may determine that a RS transmission has been triggered, (e.g., by receiving a trigger message from a base station and/or according to a configured schedule). The UE may have a set of antennas available for RS transmission and may select a subset of antennas to be used based on the signal property of each antenna. The signal property may be based on one or more of a received signal quality associated with each antenna, an available transmission power of the UE, the bandwidth factor of the RS transmission, a correlation factor for each antenna, and the like. Accordingly, the UE may transmit the RS using the selected subset of antennas.

A method of wireless communication is described. The method may include determining, at a UE, that a RS transmission has been triggered, selecting a subset of antennas from a set of available antennas based at least in part on a signal property associated with each antenna of the subset of antennas, and transmitting the RS using the selected subset of antennas.

An apparatus for wireless communication is described. The apparatus may include means for determining, at a UE, that a RS transmission has been triggered, means for selecting a subset of antennas from a set of available antennas based at least in part on a signal property associated with each antenna of the subset of antennas, and means for transmitting the RS using the selected subset of antennas.

Another apparatus for wireless communication is described. The apparatus may include a processor, memory in electronic communication with the processor, and instructions stored in the memory. The instructions may be operable to cause the processor to determine, at a UE, that a RS transmission has been triggered, select a subset of antennas from a set of available antennas based at least in part on a signal property associated with each antenna of the subset of antennas, and transmit the RS using the selected subset of antennas.

A non-transitory computer readable medium for wireless communication is described. The non-transitory computer-readable medium may include instructions operable to cause a processor to determine, at a UE, that a RS transmission has been triggered, select a subset of antennas from a set of available antennas based at least in part on a signal property associated with each antenna of the subset of antennas, and transmit the RS using the selected subset of antennas.

Some examples of the method, apparatus, and non-transitory computer-readable medium described above may further include processes, features, means, or instructions for determining that the RS transmission may have been triggered comprises receiving a trigger message from a base station, or identifying the RS transmission trigger according to a configured periodic schedule, or combinations thereof.

Some examples of the method, apparatus, and non-transitory computer-readable medium described above may further include processes, features, means, or instructions for identifying a received signal quality associated with each antenna, wherein the signal property may be based at least in part on the received signal quality. Some examples of the method, apparatus, and non-transitory computer-readable medium described above may further include processes, features, means, or instructions for selecting the subset of antennas based at least in part on the received signal quality.

In some examples of the method, apparatus, and non-transitory computer-readable medium described above, the selecting may be based on the received signal quality satisfying a threshold level.

Some examples of the method, apparatus, and non-transitory computer-readable medium described above may further include processes, features, means, or instructions for selecting a single antenna as the subset of antennas when the received signal quality for each antenna of the set of available antennas fails to satisfy the threshold level.

Some examples of the method, apparatus, and non-transitory computer-readable medium described above may further include processes, features, means, or instructions for identifying an available transmission power associated with the UE, wherein the signal property may be based at least in part on the available transmission power. Some examples of the method, apparatus, and non-transitory computer-readable medium described above may further include processes, features, means, or instructions for selecting the subset of antennas based at least in part on the available transmission power.

Some examples of the method, apparatus, and non-transitory computer-readable medium described above may further include processes, features, means, or instructions for identifying a power scaling factor for the RS transmission using the subset of antennas.

Some examples of the method, apparatus, and non-transitory computer-readable medium described above may further include processes, features, means, or instructions for identifying a bandwidth factor associated with the RS transmission, wherein the signal property may be based at least in part on the bandwidth factor. Some examples of the method, apparatus, and non-transitory computer-readable medium described above may further include processes, features, means, or instructions for selecting the subset of antennas based at least in part on the bandwidth factor.

Some examples of the method, apparatus, and non-transitory computer-readable medium described above may further include processes, features, means, or instructions for identifying a correlation factor associated with each antenna, wherein the signal property may be based at least in part on the correlation factor. Some examples of the method, apparatus, and non-transitory computer-readable medium described above may further include processes, features, means, or instructions for selecting the subset of antennas based at least in part on the correlation factor failing to satisfy a threshold level.

Some examples of the method, apparatus, and non-transitory computer-readable medium described above may further include processes, features, means, or instructions for identifying a Doppler property associated with each antenna, wherein the signal property may be based at least in part on the Doppler property. Some examples of the method, apparatus, and non-transitory computer-readable medium described above may further include processes, features, means, or instructions for selecting the subset of antennas based at least in part on the Doppler property satisfying a threshold level.

In some examples of the method, apparatus, and non-transitory computer-readable medium described above, the Doppler property comprises a Doppler spread, or a Doppler shift, or combinations thereof.

Some examples of the method, apparatus, and non-transitory computer-readable medium described above may further include processes, features, means, or instructions for receiving an antenna selection authorization indication from the base station.

In some examples of the method, apparatus, and non-transitory computer-readable medium described above, the indication may be received in a system information block (SIB), or a radio resource control (RRC) message, or the RS trigger message, or combinations thereof.

In some examples of the method, apparatus, and non-transitory computer-readable medium described above, the indication may be associated with a predefined set of time units.

In some examples of the method, apparatus, and non-transitory computer-readable medium described above, the predefined set of time units comprises a set of subframes, or a set of radio frames, or a set of slots, or a set of symbols, or combinations thereof.

Some examples of the method, apparatus, and non-transitory computer-readable medium described above may further include processes, features, means, or instructions for selecting a transmission characteristic for the RS transmission from each antenna of the subset of antennas, wherein the selected transmission characteristic conveys an indication that identifies the antenna.

In some examples of the method, apparatus, and non-transitory computer-readable medium described above, a first transmission characteristic may be associated with a first antenna having a first received signal quality, and a second transmission characteristic may be associated with a second antenna having a second received signal quality, wherein the first received signal quality may be higher than the second received signal quality.

Some examples of the method, apparatus, and non-transitory computer-readable medium described above may further include processes, features, means, or instructions for transmitting a message to the base station to convey an indication of the first antenna having the first received signal quality and the second antenna having the second received signal quality.

Some examples of the method, apparatus, and non-transitory computer-readable medium described above may further include processes, features, means, or instructions for determining that the RS transmission may be a multi-carrier RS transmission. Some examples of the method, apparatus, and non-transitory computer-readable medium described above may further include processes, features, means, or instructions for selecting the subset of antennas based at least in part on the multi-carrier RS transmission.

DETAILED DESCRIPTION

As described herein, a UE may have additional information that may be used to determine which transmission chains to use for transmission of a RS, such as a SRS. For example, in a time division duplexing (TDD) scenario, the uplink channel as seen by a base station may substantially indicate the quality or other parameters of the corresponding downlink channel as seen by a UE, for example, the two channels may be substantially equal because of the principle of time-reciprocity between downlink and uplink wireless wave propagation. Thus, the base station may exploit the knowledge of the downlink channel conditions gleaned from the uplink channel, via, for example, uplink channel sounding, to schedule and adapt downlink transmission. The UE may also exploit its knowledge of the downlink channel, via, for example, downlink receive signal quality, to estimate or assess channel quality of the corresponding uplink channel or characteristics of the UE's transmission chains including antennas and radio frequency (RF) chains. In some scenarios, the UE may have additional or more recent information on quality or conditions of downlink or uplink channels and/or its transmission chains than the base station may have. The UE may determine that the uplink channel has the same channel characteristics as the downlink channel. Additionally or alternatively, the UE may determine that certain antennas are experiencing different channel characteristics than other antennas. Conventional techniques do not support such features.

Aspects of the disclosure are initially described in the context of a wireless communications system. For example, a UE may determine that a RS transmission has been triggered and select a subset of antennas for transmitting the RS. The subset of antennas may be selected from all of the available antennas the UE is configured with. When selecting the subset of antennas, the UE may consider a signal property associated with each antenna (e.g., received signal quality, available transmission power, etc.). The UE may use the subset of antennas for RS transmission. Thus, the UE may independently determine which antennas to use for RS transmission (e.g., in addition to and/or other than the antennas signaled by the base station for RS transmission).

Aspects of the disclosure are further illustrated by and described with reference to apparatus diagrams, system diagrams, and flowcharts that relate to RS transmission based on received signal quality.

Figure 1:
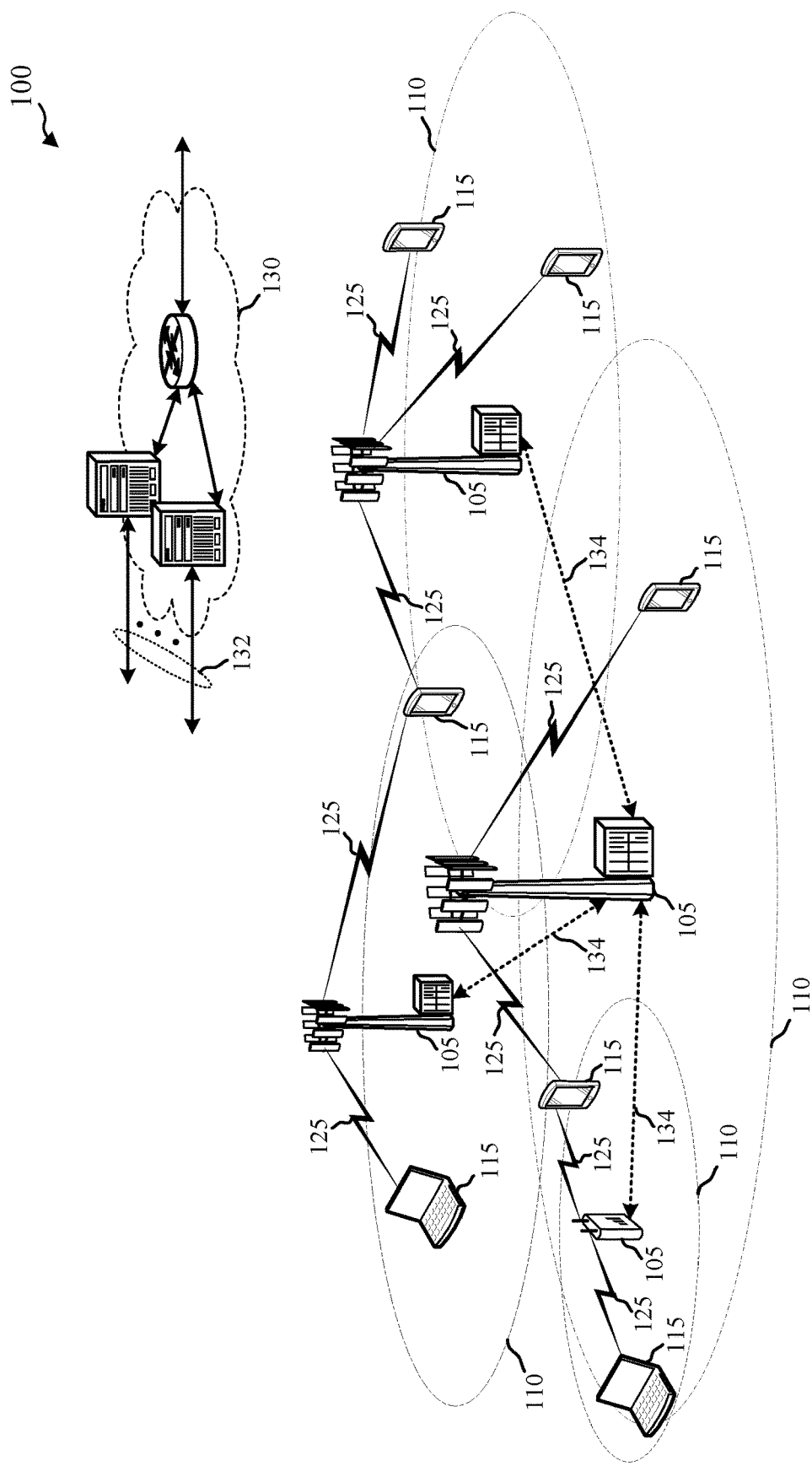
FIG. 1 illustrates an example of a system for wireless communication that supports reference signal transmission based on received signal quality in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE (or LTE-Advanced) network.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNBs 105.

Wireless communication system 100 may support one or more aspects of RS transmission based on received signal quality. Conventional techniques may provide for the base station 105 to determine which antennas the UE 115 uses for RS transmission. However, a UE 115 may be configured with multiple receive and/or transmit antennas and may know a priori that certain antennas are experiencing better channel conditions than the other antennas. Accordingly, the UE 115 may choose to transmit a RS from the antenna(s) that experience the best signal quality. For example, the UE 115 may determine that a RS transmission has been triggered (e.g., based on a trigger message received from the base station 105, according to a configured schedule, etc.). The UE 115 may select a subset of antennas from the set of available antennas based on the signal property associated with each antenna (e.g., received signal quality for each antenna). The UE 115 may transmit the RS using the selected subset of antenna(s) to base station 105.

Figure 2:
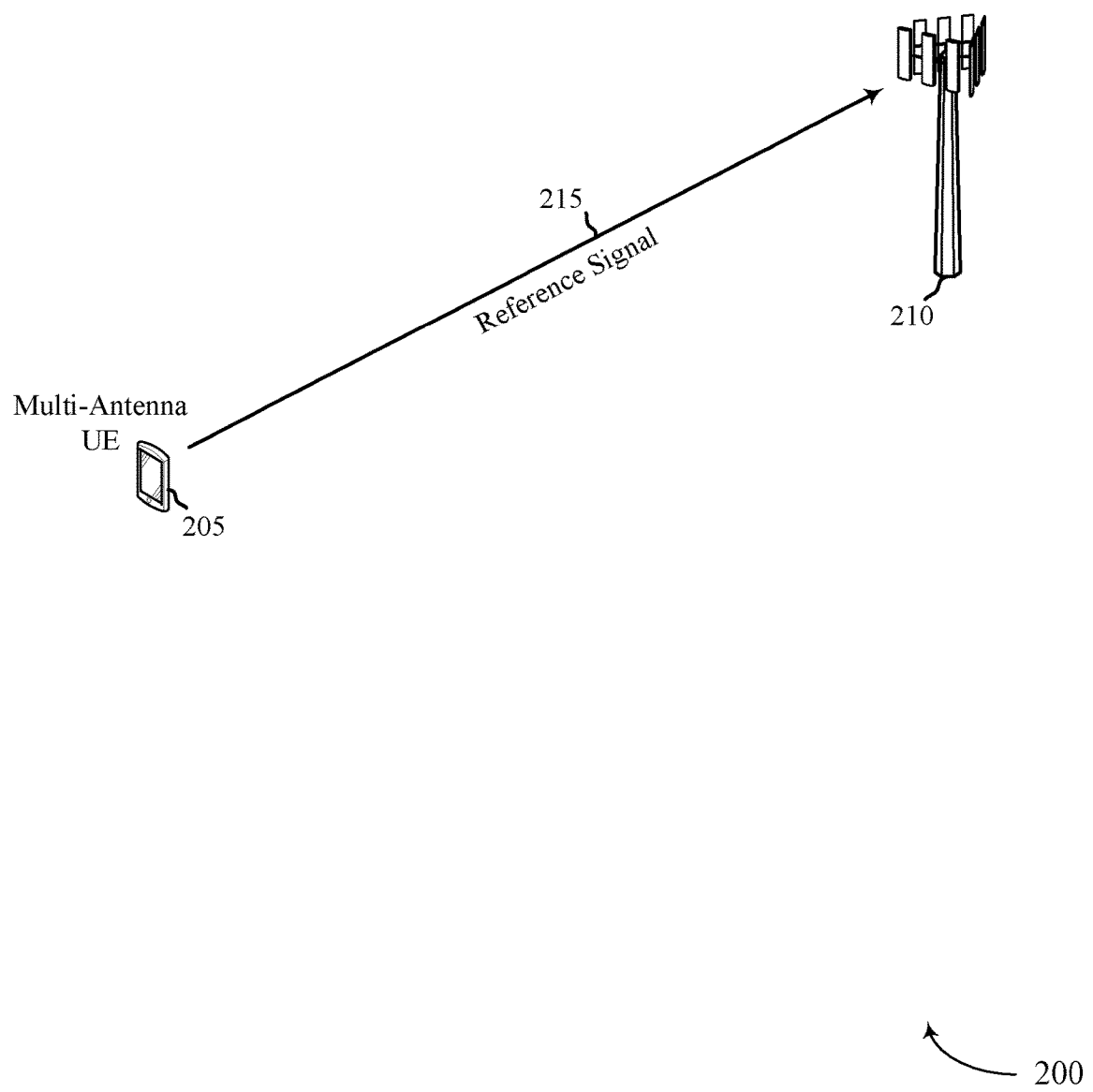
FIG. 2 illustrates an example of a wireless communication system that supports reference signal transmission based on received signal quality in accordance with aspects of the present disclosure.

FIG. 2 illustrates an example of a wireless communication system 200 for RS transmission based on received signal quality. Wireless communication system 200 may implement one or more aspects of wireless communication system 100 of FIG. 1. Wireless communication system 200 may include a UE 205 and a base station 210, which may be examples of the corresponding devices of FIG. 1.

UE 205 may be a multi-antenna UE and therefore may include more than one transmit antennas, receive antennas, transmit chains, receive chains, etc. For example, UE 205 may be configured for multiple-input/multiple-output (MIMO) communications that include transmissions and/or receptions from a plurality of antennas. Additionally or alternatively, UE 205 may be configured for beamforming operations, such as in a millimeter wave (mmW) wireless communication system, that uses a plurality of antennas. Additionally or alternatively, UE 205 may be configured for communications using multiple carriers, such as carrier aggregation (CA) techniques, that use a plurality of antennas. Thus, UE 205 may include two antennas, three antennas, four antennas, five antennas, or some other number of antennas. In some examples, UE 205 may have multiple antenna arrays, where each antenna array includes one or more antennas. References to an antenna may refer to an individual antenna and/or to an antenna array that includes at least one antenna.

Each antenna may be positioned on a different locations of UE 205. For example, certain antennas may be positioned on opposing ends, sides, etc., of UE 205. As such, different antennas may experience different signal properties. A first antenna may be blocked by the hand of the user of UE 205 and may therefore experience poor signal properties (e.g., poor received signal qualities, transmission properties, etc.). A second antenna may not be blocked, but may be positioned in an orientation during use that reduces the signal properties for that antenna. A third antenna may be unblocked and oriented (or pointed) in an optimal direction to provide improved signal properties for the antenna. UE 205 may know, (e.g., due to previous transmissions, signal loss, etc.) which of the antennas from the set of available antennas are experiencing the greatest level of signal properties and which antennas are experiencing the poorest level of signal properties.

Base station 210 may be a serving base station with respect to UE 205 and may therefore control one or more aspects of communications with UE 205. For example and according to conventional techniques, base station 210 may determine and control which antennas UE 205 are used for a RS transmission 215. However, UE 205 configured in accordance with the described techniques may select the subset of antennas to use for RS transmission 215 based on the signal property of each available antenna. For example, UE 205 may determine that a RS transmission 215 has been triggered (e.g., based on a trigger message received from base station 210, based on a configured schedule, etc.). In some aspects, UE 205 may determine what signal property is associated with each antenna of UE 205. UE 205 may then select a subset of antennas from the available antennas and use the selected subset of antennas for the RS transmission 215.

In some aspects, UE 205 may select antennas having a better received signal quality for the RS transmission 215. For example, when UE 205 has M antennas available for simultaneous transmission of the RS, the UE 205 may select to transmit from the M antennas that have a better reference signal received power (RSRP) and/or reference signal received quality (RSRQ). In some aspects, this selection of antennas by UE 205 may be preconfigured, may be signaled to UE 205 from base station 210 (e.g., in a system information block (SIB) element), and/or UE 205 may autonomously select which antennas to use for RS transmission.

In some aspects, UE 205 may only select antennas for the subset of antennas for RS transmission 215 when the antennas have a signal property above a threshold value. For example, UE 205 may select antennas having a RSRP/RSRQ above a threshold value for the RS transmission 215. For antennas having a signal property below the threshold value, UE 205 may not select these antennas for inclusion in the subset of antennas for RS transmission 215.

In some aspects, the signal property may be based on an available transmission power of UE 205. A power scaling factor for antennas may be based on whether other antennas are selected for the subset of antennas. When UE 205 transmits the RS from two antennas, and the pathloss is such that UE 205 transmits at full power, the UE 205 may scale the RS transmission 215 from a given antenna by a power scaling factor (e.g., -3 dB) regardless of whether the other antenna is selected for the subset of antennas. This may provide for base station 210 to perform per-antenna signal processing and improve pathloss estimates. In some aspects, a threshold level may be preconfigured, may be signaled to UE 205 from base station 210 (e.g., in a SIB element), may be signaled via UE-specific signaling (e.g., radio resource control (RRS) signaling), and/or UE 205 may autonomously determine which threshold level to use.

In some aspects, UE 205 may select the subset of antennas to use for RS transmission 215 based on an overall signal property. For example, when the RSRP/RSRQ for all available antennas has dropped below a threshold level, UE 205 may select a single antenna as the subset of antennas.

In some aspects, the signal property may be based on a bandwidth factor associated with the RS transmission 215. For example, when a smaller bandwidth is used for RS transmission 215, UE 205 may not be power limited and may therefore select multiple antennas as the subset of antennas. In another example, when a wider bandwidth is used for RS transmission 215, UE 205 may reduce the number of antennas selected for the subset of antennas.

In some aspects, the signal property for each antenna may be based on a Doppler property. For example, when the Doppler property is low, UE 205 may select more antennas for the subset of antennas. Similarly, when the Doppler property is high, UE 205 may select fewer antennas and/or antennas having a predefined received signal quality. In some aspects, when the Doppler property is high and the RS transmission 215 periodicity is a fixed time unit (e.g., every 10 milliseconds), UE 205 may select the antenna having the best signal property as the subset of antennas to use for RS transmission 215. When the Doppler property is lower, UE 205 may select the best two antennas for RS transmission according to a different time unit (e.g., every 20 milliseconds).

In some aspects, the signal property may be based on a correlation factor associated with each available antenna. For example, when two antennas are highly correlated, UE 205 may not select both of those antennas for the subset of antennas and may, instead, select one of those two antennas to use for the RS transmission 215. This may include sending RS transmission 215 of both antennas (e.g., by adding the RS from the two antennas), but transmitting both from the same physical antenna.

In some aspects, the signal property may be based on whether the RS transmission 215 is associated with multiple carriers. In a multi-carrier context, different antennas may be considered more optimal for different component carriers. Therefore, UE 205 may determine to transmit multiple component carriers or a single component carrier based on the received signal quality (e.g., RSRP/RSRQ), Doppler property, correlation factor, power scaling, etc., as is discussed above.

In some aspects, the described techniques may be combined with other antenna selection techniques (e.g., conventional techniques). For example, in certain time units (e.g., subframes, radio frames, slots, symbols, etc.) UE 205 may use the predetermined antennas (e.g., as signaled by base station 210 and/or preconfigured). In other time units, UE 205 may select the subset of antennas from the set of available antennas to use for RS transmission 215. In the example where the RS transmission 215 is triggered by base station 210, the indication of whether UE 205 may select the antennas for RS transmission 215 may be signaled in the grant that triggers the RS transmission 215. For example, an RS trigger message may include a field in which UE 205 is signaled whether RS is transmitted from a fixed antenna or from an antenna selected by UE 205 using the presently described techniques.

Base station 210 may also be configured to determine which antenna was used for RS transmission 215. For example, UE 205 may select a transmission characteristic for the RS transmission 215 that conveys an indication of which antenna RS transmission 215 was transmitted from. In some aspects, each RS transmission 215 may use a different signal. For example, UE 205 may select transmission characteristics using different tones, combs, cyclic shifts, scrambling sequences, etc., for each antenna. Base station 210 may perform detection of these transmission characteristics to determine which antenna the RS transmission 215 was transmitted from.

In some aspects, the transmission characteristic may not be based on the actual antenna, but, instead, based on the ordering of the antennas with respect to the signal property. For example, an antenna associated with the highest signal property may be associated with a first set of tones, combs, cyclic shifts, scrambling sequence, etc. The antenna associated with the next highest signal property may be associated with a second set of tones, combs, etc.

In some aspects, UE 205 may signal in a separate message (e.g., a channel state information (CSI) message, a precoding matrix indicator (PMI) message, a rank indicator (RI) message, etc.), which antenna is associated with which signal property value. This message may be sent periodically and/or sent once and update when there is a change to the ranking of antennas. As one example, if during a first time unit (e.g., subframe N) UE 205 transmitted from antenna 0, and now the best antenna is antenna 1, the UE 205 may transmit RS transmission 215 in subframe M from antenna 1 and additionally report the new antenna configuration (e.g., by transmitting physical uplink control channel (PUCCH) in subframe M or a different subframe).

Figure 3:
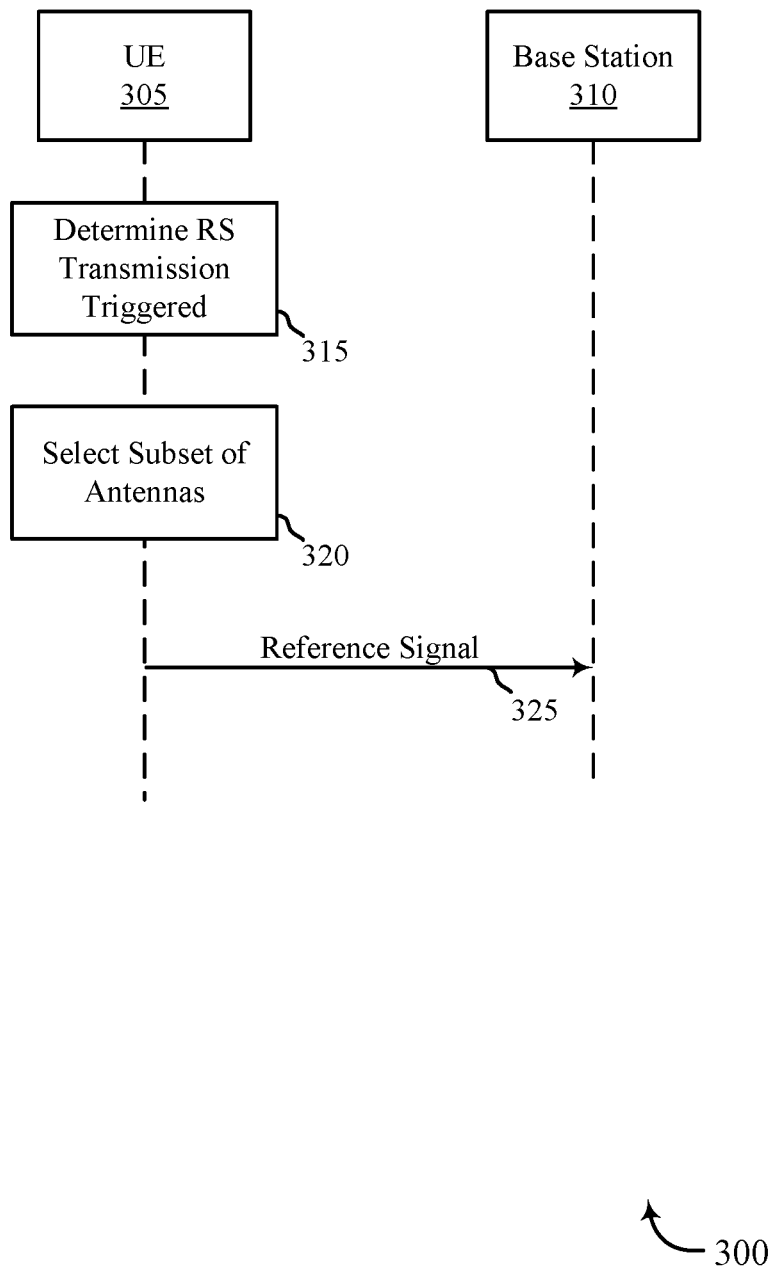
FIG. 3 illustrates an example of a process flow that supports reference signal transmission based on received signal quality in accordance with aspects of the present disclosure.

FIG. 3 illustrates an example of a process flow 300 for RS transmission based on received signal quality. Process flow 300 may implement one or more aspects of wireless communication systems 100 and/or 200 of FIGS. 1 and 2. Process flow 300 may include a UE 305 and a base station 310, which may be examples of the corresponding devices of FIGS. 1 and/or 2. Base station 310 may be a serving base station with respect to UE 305.

At 315, UE 305 may determine that an RS transmission has been triggered. The RS transmission may be triggered based on receiving a trigger message from base station 310 (not shown), based on a preconfigured schedule, etc.

In some aspects, UE 305 may receive an antenna selection authorization from base station 310 (not shown). The authorization may be associated with time units (e.g., subframes, radio frames, symbols, slots, etc.).

At 320, UE 305 may select a subset of antennas from a set of available antennas. The subset of antennas may be selected based on a signal property associated with each antenna (e.g., received signal quality, etc.). For example, a particular antenna may experience low received signal quality, (e.g., as indicated by low RSRP/RSRQ measures of cell RSs received at the UE 305). The UE 305 may skip the antenna and select another antenna for sounding to enhance efficiency and reduce power consumption. Additionally or alternatively, the subset of antennas may be selected to include a single antenna when the signal property (e.g., received signal quality) is below or otherwise fails to satisfy a threshold level. In some circumstances, the UE 305 may select antennas based on its prior information on which antennas have better channel conditions than the other ones.

At 325, UE 305 may transmit a RS to base station 310 using the selected subset of antennas. In some aspects, UE 305 may select a transmission characteristic for the RS transmission to convey an indication of which antenna was used to transmit the RS. The transmission characteristic may be selected based on which antennas have the best signal property (e.g., signal property order) and/or based on each antenna may be associated with a different transmission characteristic. UE 305 may also send a separate message to the base station 310 on its antenna selections. The base station 310 may perform signal detection on the RS sent by the UE to detect which antenna the RS corresponds to.

Figure 4:
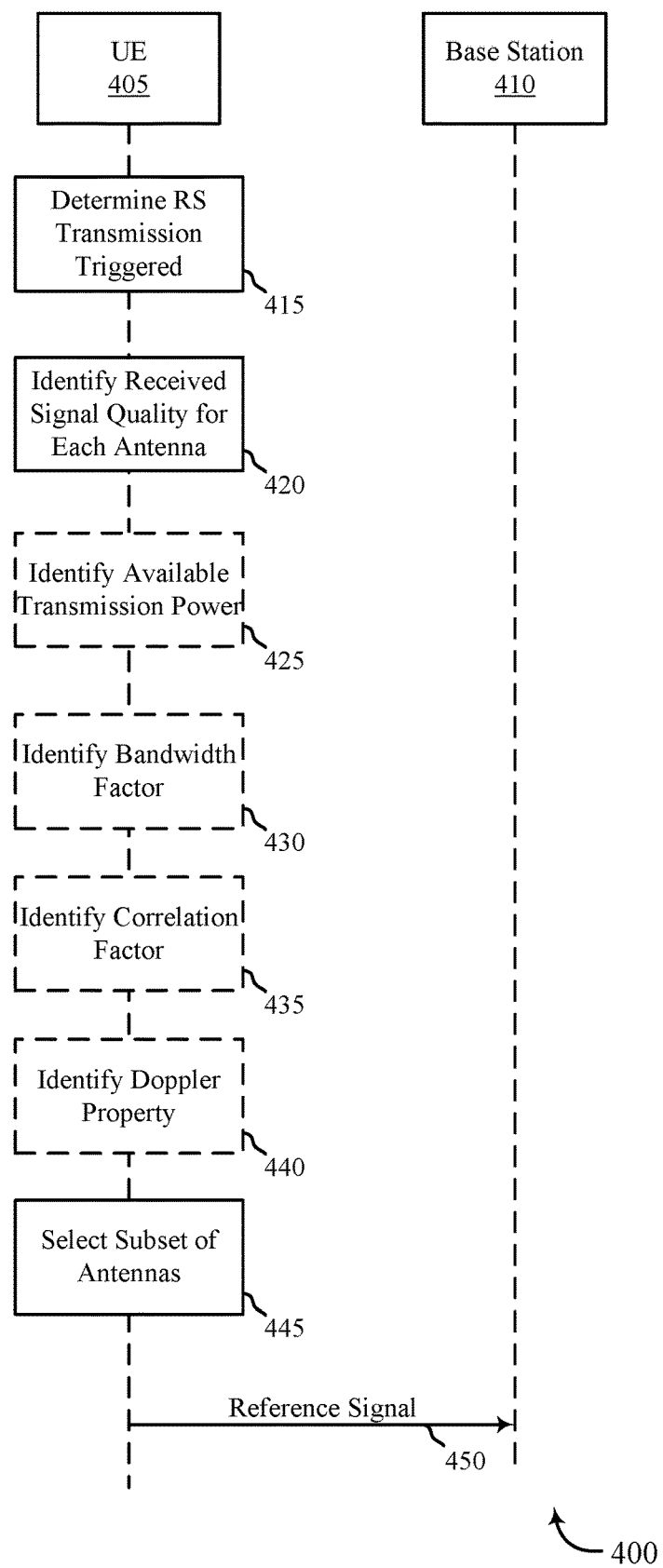
FIG. 4 illustrates an example of a process flow that supports reference signal transmission based on received signal quality in accordance with aspects of the present disclosure.

FIG. 4 illustrates an example of a process flow 400 for RS transmission based on received signal quality. Process flow 400 may implement one or more aspects of wireless communication systems 100 and/or 200 of FIGS. 1 and 2. Process flow 400 may implement aspects of process flow 300 of FIG. 3. Process flow 400 may include a UE 405 and a base station 410, which may be examples of the corresponding devices of FIGS. 1 through 3. Base station 410 may be a serving base station with respect to UE 405.

At 415, UE 405 may determine that an RS transmission has been triggered. The RS transmission may be triggered based on receiving a trigger message from base station 410 (not shown), based on a preconfigured schedule, etc.

At 420, UE 405 may identify a received signal quality (e.g., RSRP, RSRQ, etc.) associated with each available antenna, for example, from the set of available antennas. UE 405 may determine the received channel quality for each antenna based on periodic testing, based on previous communications, based on monitoring each antenna, etc. In some aspects, UE 405 may determine whether the received signal quality for each antenna satisfies a threshold level. UE 405 may determine whether the received signal quality for all available antennas fails to satisfy the threshold level.

At 425, UE 405 may optionally identify an available transmission power associated with UE 405. The available transmission power may be associated with a power scaling factor for RS transmissions from different antennas.

At 430, UE 405 may optionally identify a bandwidth factor associated with the triggered RS transmission. The bandwidth factor may be associated with a number of tones or frequencies that the RS transmission will be transmitted on.

At 435, UE 405 may optionally identify a correlation factor associated with each available antenna.

At 440, UE 405 may optionally identify a Doppler property associated with each available antenna. The Doppler property may be based on a Doppler spread, a Doppler shift, etc., associated with each antenna.

At 445, UE 405 may select a subset of antennas based on the identified received signal quality, the available transmission power, the bandwidth factor, the correlation factor, and/or the Doppler property, as is discussed above. In some aspects, UE 405 may assign a priority factor to each consideration having an equal weight or affording a higher weight to certain consideration (e.g., received signal quality).

At 450, UE 405 may transmit a RS to base station 410 using the selected subset of antennas. In some aspects, UE 405 may select a transmission characteristic for the RS transmission to convey an indication of which antenna was used to transmit the RS. The UE 405 may transmit the RS of each antenna using a different signal (e.g., different tones, combs, cyclic shifts or scrambling sequences may be used from different antennas). The base station 410 may perform detection of these sequences and decide which antennas have been used for transmission. In another aspects, the signal is not decided based on the actual antenna, but on the ordering of the antenna with respect to RSRP/RSRQ. For example, the UE 405 may use a set of tones or combs or CS or scrambling for the best antenna (e.g., measured with respect to RSRP/RSRQ), and use a different set for the second best antenna, and so on. Additionally, the UE 405 may signal in a separate message (e.g., CSI/PMI/RI feedback) which antenna is the best one. UE 405 may send this message when or after a switch between "best antennas" occurs. For example, if in subframe NUE 405 transmitted from antenna 0, and now the best antenna is antenna 1, the UE 405 may transmit RS in subframe M from antenna 1, and additionally report the new antenna configuration (e.g., by transmitting PUCCH in subframe M or a different subframe).

Figure 5:
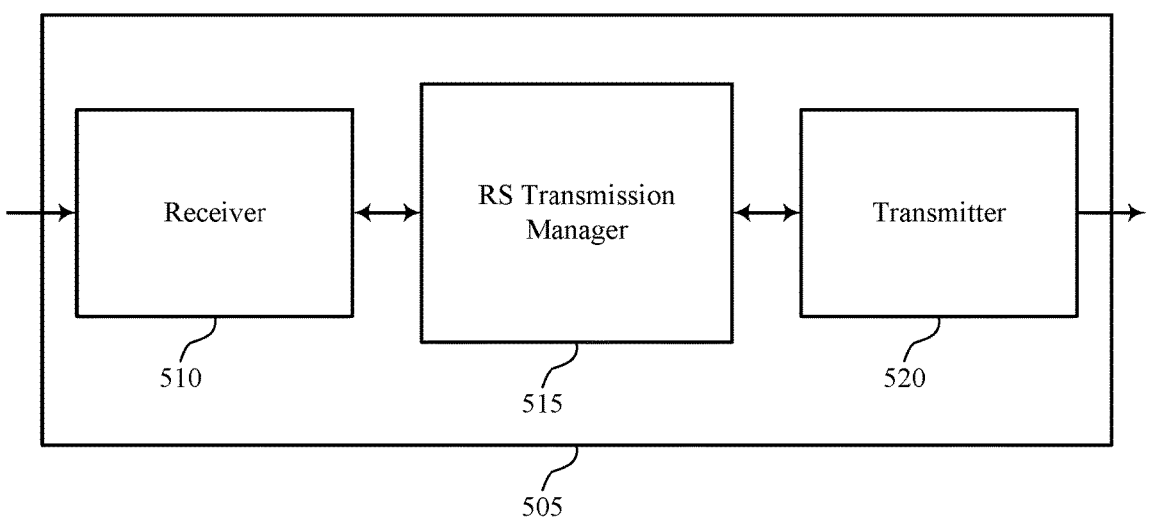
FIGS. 5 through 7 show block diagrams of a device that supports reference signal transmission based on received signal quality in accordance with aspects of the present disclosure.

FIG. 5 shows a block diagram 500 of a wireless device 505 that supports RS transmission based on received signal quality in accordance with various aspects of the present disclosure. Wireless device 505 may be an example of aspects of a UE 115 as described with reference to FIGS. 1 through 4. Wireless device 505 may include a receiver 510, a RS transmission manager 515, and a transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, information related to RS transmission based on received signal quality, etc.). Information may be passed on to other components of the device. The receiver 510 may be an example of aspects of the transceiver 835 described with reference to FIG. 8.

RS transmission manager 515 may be an example of aspects of the RS transmission manager 815 described with reference to FIG. 8.

RS transmission manager 515 may determine that a RS transmission has been triggered, select a subset of antennas from a set of available antennas based on a signal property associated with each antenna of the subset of antennas, and transmit the RS using the selected subset of antennas.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may include a single antenna, or it may include a set of antennas.

Figure 6:
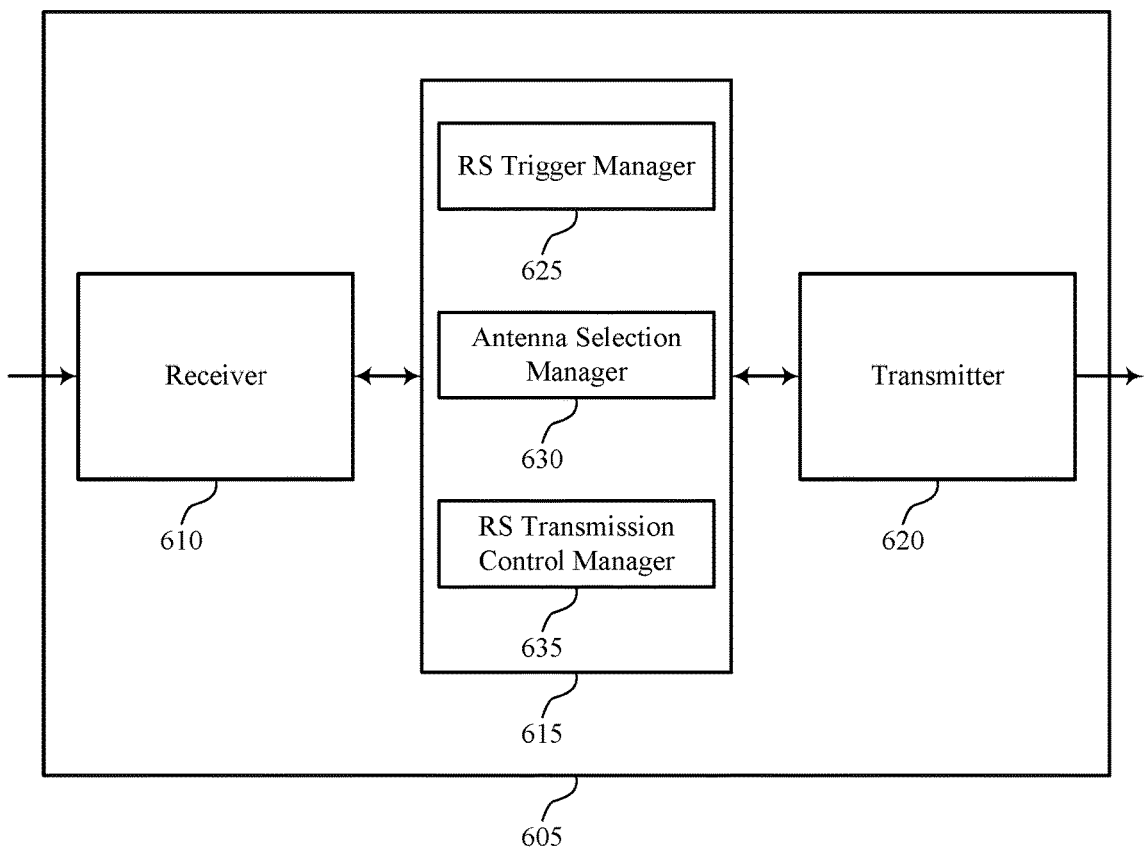

FIG. 6 shows a block diagram 600 of a wireless device 605 that supports RS transmission based on received signal quality in accordance with various aspects of the present disclosure. Wireless device 605 may be an example of aspects of a wireless device 505 or a UE 115 as described with reference to FIGS. 1 through 5. Wireless device 605 may include receiver a 610, a RS transmission manager 615, and a transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, information related to RS transmission based on received signal quality, etc.). Information may be passed on to other components of the device. The receiver 610 may be an example of aspects of the transceiver 835 described with reference to FIG. 8.

RS transmission manager 615 may be an example of aspects of the RS transmission manager 815 described with reference to FIG. 8.

RS transmission manager 615 may also include a RS trigger manager 625, an antenna selection manager 630, and a RS transmission control manager 635.

RS trigger manager 625 may determine, at a UE, that a RS transmission has been triggered. RS trigger manager 625 may determine that the RS transmission has been triggered by receiving a trigger message from a base station, or identifying the RS transmission trigger according to a configured periodic schedule, or combinations thereof.

Antenna selection manager 630 may select a subset of antennas from a set of available antennas based on a signal property associated with each antenna of the subset of antennas. Antenna selection manager 630 may receive an antenna selection authorization indication from the base station. In some cases, the indication is received in a SIB, or a RRC message, or the RS trigger message, or combinations thereof. In some cases, the indication is associated with a predefined set of time units. In some cases, the predefined set of time units includes a set of subframes, or a set of radio frames, or a set of slots, or a set of symbols, or combinations thereof.

RS transmission control manager 635 may transmit the RS using the selected subset of antennas.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may include a single antenna, or it may include a set of antennas.

Figure 7:
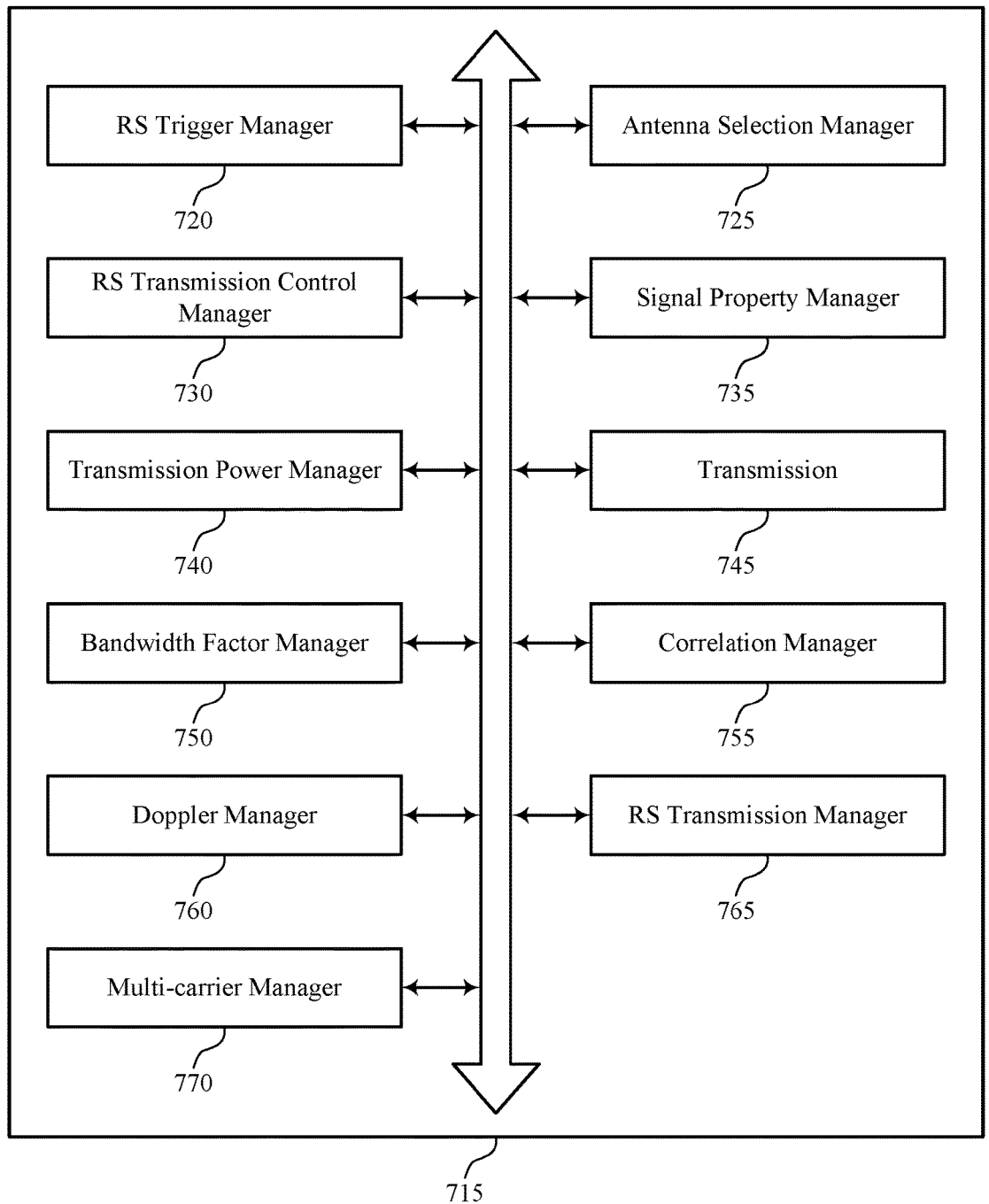

FIG. 7 shows a block diagram 700 of a RS transmission manager 715 that supports RS transmission based on received signal quality in accordance with various aspects of the present disclosure. The RS transmission manager 715 may be an example of aspects of a RS transmission manager 515, a RS transmission manager 615, or a RS transmission manager 815 described with reference to FIGS. 5, 6, and 8. The RS transmission manager 715 may include a RS trigger manager 720, an antenna selection manager 725, a RS transmission control manager 730, a signal property manager 735, a transmission power manager 740, a transmission 745, a bandwidth factor manager 750, a correlation manager 755, a Doppler manager 760, a RS transmission manager 765, and a multi-carrier manager 770. Each of these modules may communicate, directly or indirectly, with one another (e.g., via one or more buses).

RS trigger manager 720 may determine, at a UE, that a RS transmission has been triggered and determine that the RS transmission has been triggered by receiving a trigger message from a base station, or identifying the RS transmission trigger according to a configured periodic schedule, or combinations thereof.

Antenna selection manager 725 may select a subset of antennas from a set of available antennas based on a signal property associated with each antenna of the subset of antennas. Antenna selection manager 725 may receive an antenna selection authorization indication from the base station. In some cases, the indication is received in a SIB, or a RRC message, or the RS trigger message, or combinations thereof. In some cases, the indication is associated with a predefined set of time units. In some cases, the predefined set of time units includes a set of subframes, or a set of radio frames, or a set of slots, or a set of symbols, or combinations thereof.

RS transmission control manager 730 may transmit the RS using the selected subset of antennas.

Signal property manager 735 may identify a received signal quality associated with each antenna, where the signal property is based on the received signal quality, select the subset of antennas based on the received signal quality. Signal property manager 735 may select a single antenna as the subset of antennas when the received signal quality for each antenna of the set of available antennas fails to satisfy the threshold level. In some cases, the selecting may be based on the received signal quality satisfying a threshold level.

Transmission power manager 740 may identify an available transmission power associated with the UE, where the signal property is based on the available transmission power and select the subset of antennas based on the available transmission power.

Transmission 745 may identify a power scaling factor for the RS transmission 745 using the subset of antennas.

Bandwidth factor manager 750 may identify a bandwidth factor associated with the RS transmission, where the signal property is based on the bandwidth factor and select the subset of antennas based on the bandwidth factor.

Correlation manager 755 may identify a correlation factor associated with each antenna, where the signal property is based on the correlation factor, and select the subset of antennas based on the correlation factor failing to satisfy a threshold level.

Doppler manager 760 may identify a Doppler property associated with each antenna, where the signal property is based on the Doppler property and select the subset of antennas based on the Doppler property satisfying a threshold level. In some cases, the Doppler property includes a Doppler spread, or a Doppler shift, or combinations thereof.

RS transmission manager 765 may select a transmission characteristic for the RS transmission from each antenna of the subset of antennas, where the selected transmission characteristic conveys an indication that identifies the antenna. RS transmission manager 765 may transmit a message to the base station to convey an indication of the first antenna having the first received signal quality and the second antenna having the second received signal quality. In some cases, a first transmission characteristic is associated with a first antenna having a first received signal quality and a second transmission characteristic is associated with a second antenna having a second received signal quality, where the first received signal quality is higher than the second received signal quality.

Multi-carrier manager 770 may determine that the RS transmission is a multi-carrier RS transmission and select the subset of antennas based on the multi-carrier RS transmission.

Figure 8:
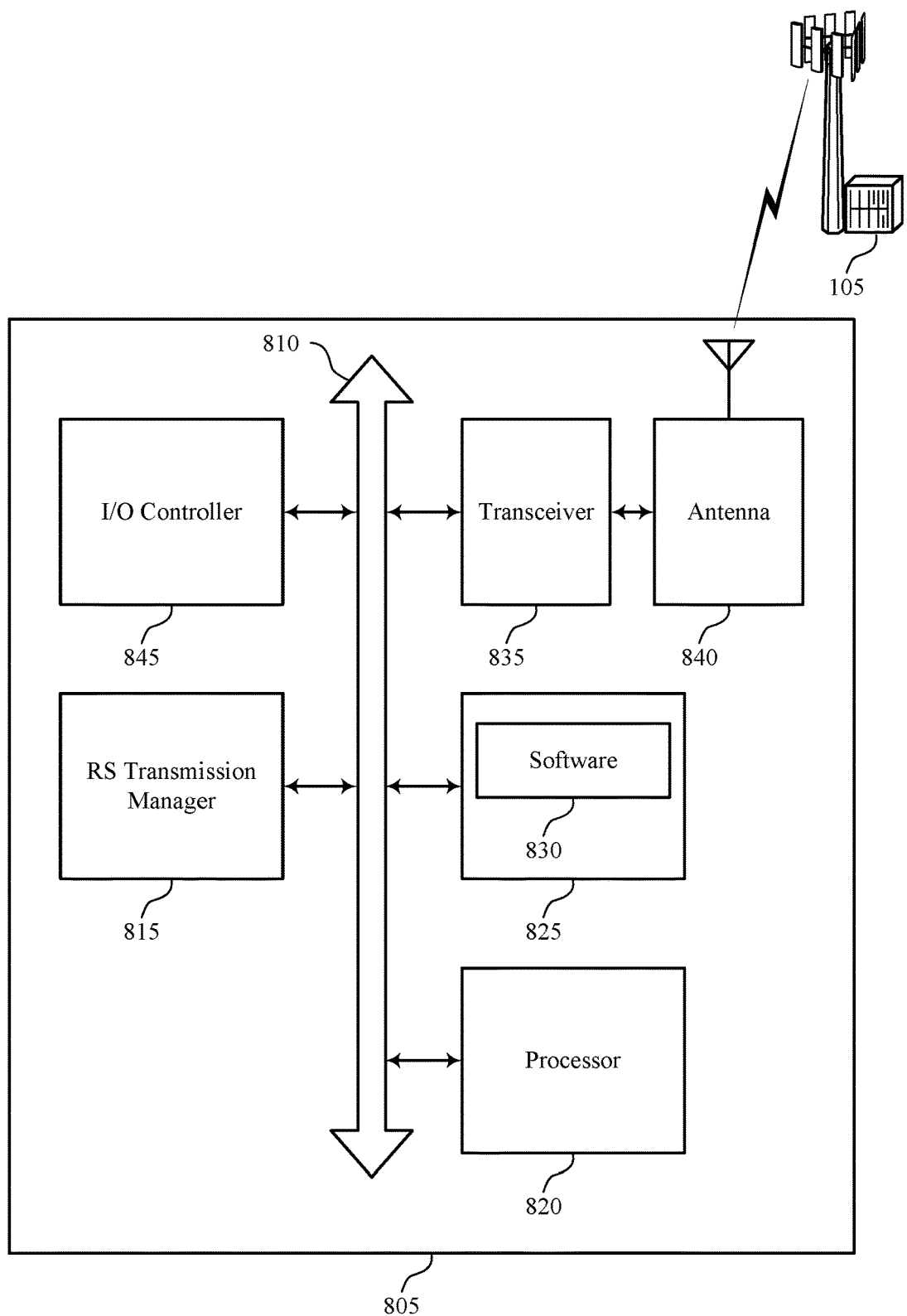
FIG. 8 illustrates a block diagram of a system including a UE that supports reference signal transmission based on received signal quality in accordance with aspects of the present disclosure.

FIG. 8 shows a diagram of a system 800 including a device 805 that supports RS transmission based on received signal quality in accordance with various aspects of the present disclosure. Device 805 may be an example of or include the components of wireless device 505, wireless device 605, or a UE 115 as described above, for example, with reference to FIGS. 1 through 6. Device 805 may include components for bi-directional voice and data communications including components for transmitting and receiving communications, including a RS transmission manager 815, a processor 820, a memory 825, a software 830, a transceiver 835, an antenna 840, and a I/O controller 845. These components may be in electronic communication via one or more busses (e.g., bus 810). Device 805 may communicate wirelessly with one or more base stations 105.

RS transmission manager 815 may determine that a RS transmission has been triggered, select a subset of antennas from a set of available antennas based on a signal property associated with each antenna of the subset of antennas, and transmit the RS using the selected subset of antennas. RS transmission manager 815 may select a transmission characteristic for the RS transmission from each antenna of the subset of antennas, where the selected transmission characteristic conveys an indication that identifies the antenna. RS transmission manager 815 may transmit a message to the base station to convey an indication of the first antenna having the first received signal quality and the second antenna having the second received signal quality. In some cases, a first transmission characteristic is associated with a first antenna having a first received signal quality and a second transmission characteristic is associated with a second antenna having a second received signal quality, where the first received signal quality is higher than the second received signal quality.

Processor 820 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting RS transmission based on received signal quality).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure, including code to support RS transmission based on received signal quality. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system.

Figure 9:
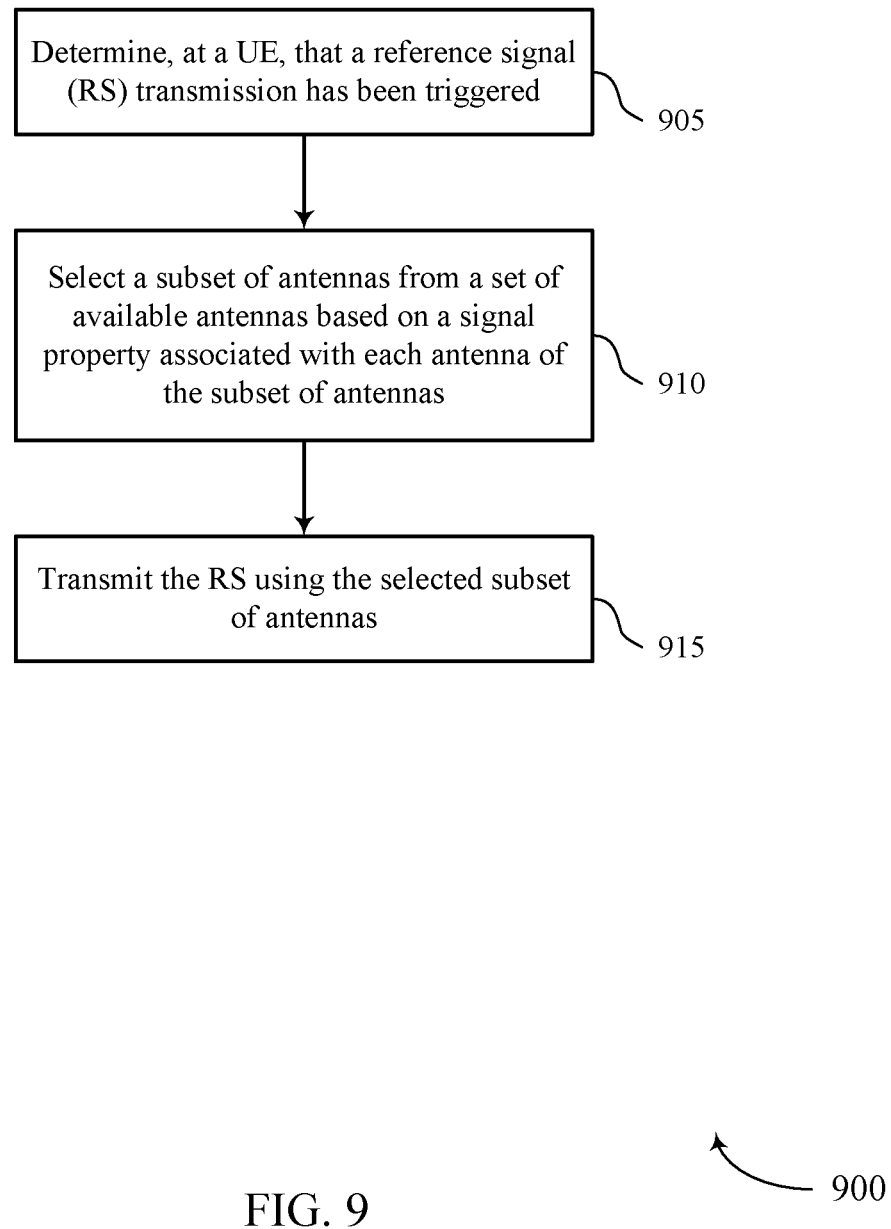
FIGS. 9 through 11 illustrate methods for reference signal transmission based on received signal quality in accordance with aspects of the present disclosure.

FIG. 9 shows a flowchart illustrating a method 900 for RS transmission based on received signal quality in accordance with various aspects of the present disclosure. The operations of method 900 may be implemented by a UE 115 or its components as described herein. For example, the operations of method 900 may be performed by a RS transmission manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 905 the UE 115 may determine that a RS transmission has been triggered. The operations of block 905 may be performed according to the methods described with reference to FIGS. 1 through 4. In certain examples, aspects of the operations of block 905 may be performed by a RS trigger manager as described with reference to FIGS. 5 through 8.

At block 910 the UE 115 may select a subset of antennas from a set of available antennas based at least in part on a signal property associated with each antenna of the subset of antennas. The operations of block 910 may be performed according to the methods described with reference to FIGS. 1 through 4. In certain examples, aspects of the operations of block 910 may be performed by an antenna selection manager as described with reference to FIGS. 5 through 8.

At block 915 the UE 115 may transmit the RS using the selected subset of antennas. The operations of block 915 may be performed according to the methods described with reference to FIGS. 1 through 4. In certain examples, aspects of the operations of block 915 may be performed by a RS transmission control manager as described with reference to FIGS. 5 through 8.

Figure 10:
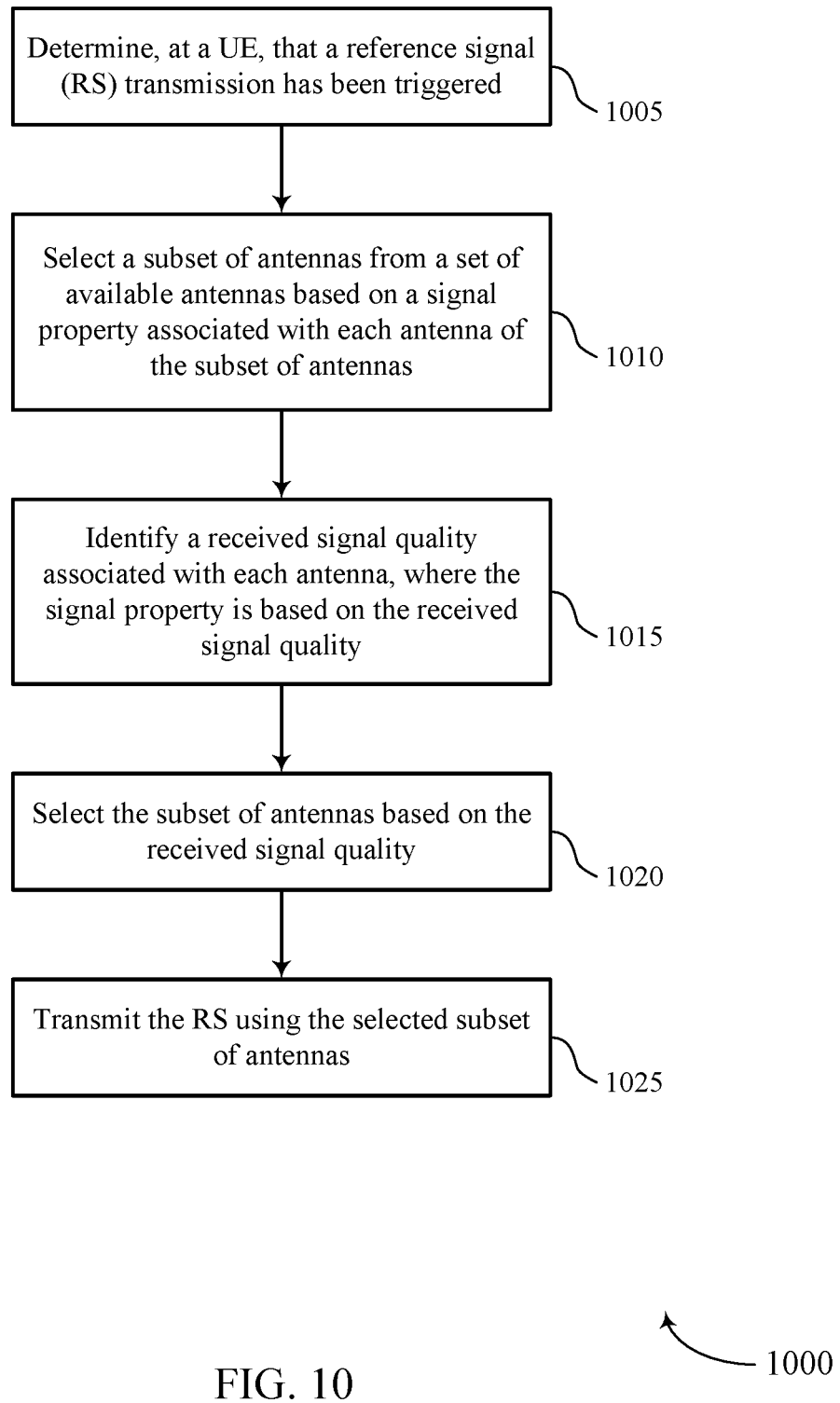

FIG. 10 shows a flowchart illustrating a method 1000 for RS transmission based on received signal quality in accordance with various aspects of the present disclosure. The operations of method 1000 may be implemented by a UE 115 or its components as described herein. For example, the operations of method 1000 may be performed by a RS transmission manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1005 the UE 115 may determine that a RS transmission has been triggered. The operations of block 1005 may be performed according to the methods described with reference to FIGS. 1 through 4. In certain examples, aspects of the operations of block 1005 may be performed by a RS trigger manager as described with reference to FIGS. 5 through 8.

At block 1010 the UE 115 may select a subset of antennas from a set of available antennas based at least in part on a signal property associated with each antenna of the subset of antennas. The operations of block 1010 may be performed according to the methods described with reference to FIGS. 1 through 4. In certain examples, aspects of the operations of block 1010 may be performed by an antenna selection manager as described with reference to FIGS. 5 through 8.

At block 1015 the UE 115 may identify a received signal quality associated with each antenna, wherein the signal property is based at least in part on the received signal quality. The operations of block 1015 may be performed according to the methods described with reference to FIGS. 1 through 4. In certain examples, aspects of the operations of block 1015 may be performed by a signal property manager as described with reference to FIGS. 5 through 8.

At block 1020 the UE 115 may select the subset of antennas based at least in part on the received signal quality. The operations of block 1020 may be performed according to the methods described with reference to FIGS. 1 through 4. In certain examples, aspects of the operations of block 1020 may be performed by a signal property manager as described with reference to FIGS. 5 through 8.

At block 1025 the UE 115 may transmit the RS using the selected subset of antennas. The operations of block 1025 may be performed according to the methods described with reference to FIGS. 1 through 4. In certain examples, aspects of the operations of block 1025 may be performed by a RS transmission control manager as described with reference to FIGS. 5 through 8.

Figure 11:
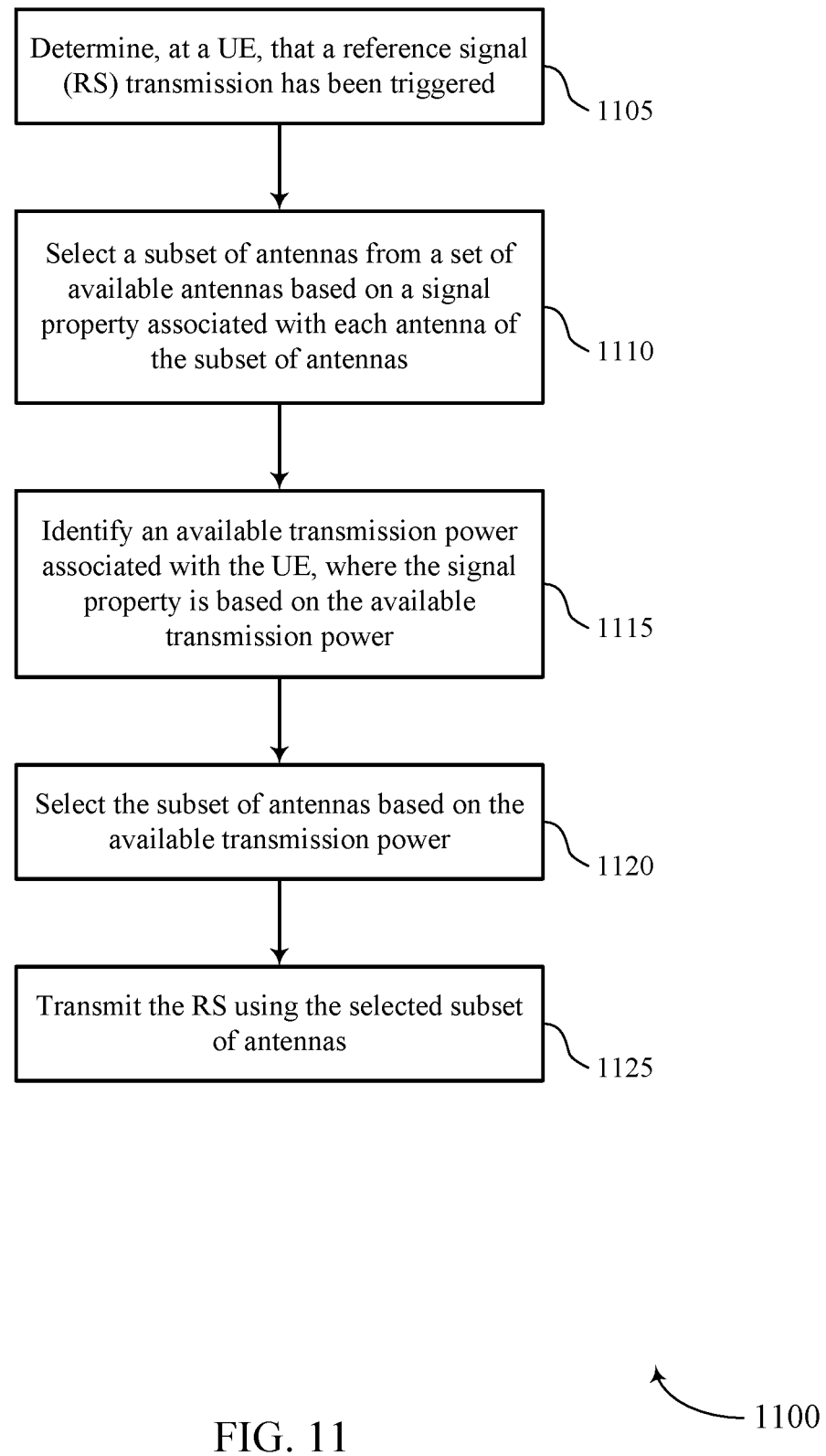

FIG. 11 shows a flowchart illustrating a method 1100 for RS transmission based on received signal quality in accordance with various aspects of the present disclosure. The operations of method 1100 may be implemented by a UE 115 or its components as described herein. For example, the operations of method 1100 may be performed by a RS transmission manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1105 the UE 115 may determine that a RS transmission has been triggered. The operations of block 1105 may be performed according to the methods described with reference to FIGS. 1 through 4. In certain examples, aspects of the operations of block 1105 may be performed by a RS trigger manager as described with reference to FIGS. 5 through 8.

At block 1110 the UE 115 may select a subset of antennas from a set of available antennas based at least in part on a signal property associated with each antenna of the subset of antennas. The operations of block 1110 may be performed according to the methods described with reference to FIGS. 1 through 4. In certain examples, aspects of the operations of block 1110 may be performed by an antenna selection manager as described with reference to FIGS. 5 through 8.

At block 1115 the UE 115 may identify an available transmission power associated with the UE, wherein the signal property is based at least in part on the available transmission power. The operations of block 1115 may be performed according to the methods described with reference to FIGS. 1 through 4. In certain examples, aspects of the operations of block 1115 may be performed by a transmission power manager as described with reference to FIGS. 5 through 8.

At block 1120 the UE 115 may select the subset of antennas based at least in part on the available transmission power. The operations of block 1120 may be performed according to the methods described with reference to FIGS. 1 through 4. In certain examples, aspects of the operations of block 1120 may be performed by a transmission power manager as described with reference to FIGS. 5 through 8.

At block 1125 the UE 115 may transmit the RS using the selected subset of antennas. The operations of block 1125 may be performed according to the methods described with reference to FIGS. 1 through 4. In certain examples, aspects of the operations of block 1125 may be performed by a RS transmission control manager as described with reference to FIGS. 5 through 8.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, the method comprising:
   determining, at a user equipment (UE), that a reference signal (RS) transmission has been triggered for a time unit;
   receiving, from a base station, an antenna selection authorization indication associated with a first set of time units;
   selecting a subset of antennas from a set of available antennas, wherein the selecting comprises autonomously selecting the subset of antennas by the UE if the time unit is within the first set of time units based at least in part on a signal property associated with each antenna of the subset of antennas and the antenna selection authorization indication, and wherein the selecting comprises selecting predetermined antennas if the time unit is within a second set of time units; and
   transmitting the RS transmission using the selected subset of antennas during the time unit.

2. The method of claim 1, further comprising:
   determining that the RS transmission has been triggered comprises receiving a trigger message from the base station, or identifying a RS transmission trigger according to a configured periodic schedule, or combinations thereof.

3. The method of claim 1, further comprising:
   identifying a received signal quality associated with each antenna, wherein the signal property is based at least in part on the received signal quality; and
   wherein the selecting is based at least in part on the received signal quality.

4. The method of claim 3, wherein the selecting is based on the received signal quality satisfying a threshold level.

5. The method of claim 3, further comprising:
   selecting a single antenna as the subset of antennas when the received signal quality for each antenna of the set of available antennas fails to satisfy a threshold level.

6. The method of claim 1, further comprising:

identifying an available transmission power associated with the UE, wherein the signal property is based at least in part on the available transmission power; and selecting the subset of antennas based at least in part on the available transmission power.

7. The method of claim 6, further comprising:

identifying a power scaling factor for the RS transmission using the subset of antennas.

8. The method of claim 1, further comprising:

identifying a bandwidth factor associated with the RS transmission, wherein the signal property is based at least in part on the bandwidth factor; and selecting the subset of antennas based at least in part on the bandwidth factor.

9. The method of claim 1, further comprising:

identifying a correlation factor associated with each antenna, wherein the signal property is based at least in part on the correlation factor; and selecting the subset of antennas based at least in part on the correlation factor failing to satisfy a threshold level.

10. The method of claim 1, further comprising:

identifying a Doppler property associated with each antenna, wherein the signal property is based at least in part on the Doppler property, further wherein the Doppler property comprises a Doppler spread, or a Doppler shift, or combinations thereof; and selecting the subset of antennas based at least in part on the Doppler property satisfying a threshold level.

11. The method of claim 1, wherein the antenna selection authorization indication is received in a system information block (SIB), or a radio resource control (RRC) message, or a trigger message, or combinations thereof.

12. The method of claim 11, wherein the first and the second sets of time units each comprise a set of subframes, or a set of radio frames, or a set of slots, or a set of symbols, or combinations thereof.

13. The method of claim 1, further comprising:

selecting a transmission characteristic for the RS transmission from each antenna of the subset of antennas, wherein the selected transmission characteristic conveys an indication that identifies the each antenna.

14. The method of claim 13, wherein a first transmission characteristic is associated with a first antenna having a first received signal quality and a second transmission characteristic is associated with a second antenna having a second received signal quality, wherein the first received signal quality is higher than the second received signal quality.

15. The method of claim 14, further comprising:

transmitting a message to the base station to convey an indication of the first antenna having the first received signal quality and the second antenna having the second received signal quality.

16. The method of claim 1, further comprising:

determining that the RS transmission is a multi-carrier RS transmission; and selecting the subset of antennas based at least in part on the multi-carrier RS transmission.

17. An apparatus for wireless communication, the apparatus comprising:

means for determining, at a user equipment (UE), that a reference signal (RS) transmission has been triggered for a time unit;

means for receiving, from a base station, an antenna selection authorization indication associated with a first set of time units;

means for selecting a subset of antennas from a set of available antennas, wherein the means for selecting comprises means for autonomously selecting the subset of antennas by the UE if the time unit is within the first set of time units based at least in part on a signal property associated with each antenna of the subset of antennas and the antenna selection authorization indication, and wherein the means for selecting comprises means for selecting predetermined antennas if the time unit is within a second set of time units; and means for transmitting the RS transmission using the selected subset of antennas during the time unit.

18. An apparatus for wireless communication, in a system, the apparatus comprising:

a processor;

memory in electronic communication with the processor; and instructions stored in the memory and operable, when executed by the processor, to cause the apparatus to:

determine, at a user equipment (UE), that a reference signal (RS) transmission has been triggered for a time unit;

receive, from a base station, an antenna selection authorization indication associated with a first set of time units;

select a subset of antennas from a set of available antennas, wherein the instructions to select comprise instructions to autonomously select the subset of antennas by the UE if the time unit is within the first set of time units based at least in part on a signal property associated with each antenna of the subset of antennas and the antenna selection authorization indication, and wherein the instructions to select comprise instructions to select predetermined antennas if the time unit is within a second set of time units; and transmit the RS transmission using the selected subset of antennas during the time unit.

19. The apparatus of claim 18, wherein the instructions are further executable by the processor to cause the apparatus to:

determine that the RS transmission has been triggered comprises receiving a trigger message from the base station, or identifying a RS transmission trigger according to a configured periodic schedule, or combinations thereof.

20. The apparatus of claim 18, wherein the instructions are further executable by the processor to cause the apparatus to:

identify a received signal quality associated with each antenna, wherein the signal property is based at least in part on the received signal quality; and wherein the selection of the subset of antennas is based at least in part on the received signal quality.

21. The apparatus of claim 20, wherein the selection is based on the received signal quality satisfying a threshold level.

22. The apparatus of claim 20, wherein the instructions are further executable by the processor to cause the apparatus to:

select a single antenna as the subset of antennas when the received signal quality for each antenna of the set of available antennas fails to satisfy a threshold level.

23. The apparatus of claim 18, wherein the instructions are further executable by the processor to cause the apparatus to:

identify an available transmission power associated with the UE, wherein the signal property is based at least in part on the available transmission power; and select the subset of antennas based at least in part on the available transmission power.

24. The apparatus of claim 18, wherein the instructions are further executable by the processor to cause the apparatus to:
identify a bandwidth factor associated with the RS transmission, wherein the signal property is based at least in part on the bandwidth factor; and
select the subset of antennas based at least in part on the bandwidth factor.

25. The apparatus of claim 18, wherein the instructions are further executable by the processor to cause the apparatus to:
identify a correlation factor associated with each antenna, wherein the signal property is based at least in part on the correlation factor; and
select the subset of antennas based at least in part on the correlation factor failing to satisfy a threshold level.

26. The apparatus of claim 18, wherein the instructions are further executable by the processor to cause the apparatus to:
identify a Doppler property associated with each antenna, wherein the signal property is based at least in part on the Doppler property, further wherein the Doppler property comprises a Doppler spread, or a Doppler shift, or combinations thereof; and
select the subset of antennas based at least in part on the Doppler property satisfying a threshold level.

27. The apparatus of claim 18, wherein the antenna selection authorization indication is received in a system information block (SIB), or a radio resource control (RRC) message, or a trigger message, or combinations thereof.

28. The apparatus of claim 18, wherein the instructions are further executable by the processor to cause the apparatus to:
select a transmission characteristic for the RS transmission from each antenna of the subset of antennas, wherein the selected transmission characteristic conveys an indication that identifies the each antenna.

29. The apparatus of claim 28, wherein a first transmission characteristic is associated with a first antenna having a first received signal quality and a second transmission characteristic is associated with a second antenna having a second received signal quality, wherein the first received signal quality is higher than the second received signal quality.

30. A non-transitory computer readable medium storing code for wireless communication, the code comprising instructions executable by a processor to:
determine, at a user equipment (UE), that a reference signal (RS) transmission has been triggered for a time unit;
receive, from a base station, an antenna selection authorization indication associated with a first set of time units;
select a subset of antennas from a set of available antennas, wherein the instructions to select comprise instructions to autonomously select the subset of antennas by the UE if the time unit is within the first set of time units based at least in part on a signal property associated with each antenna of the subset of antennas and the antenna selection authorization indication, and wherein the instructions to select comprise instructions to select predetermined antennas if the time unit is within a second set of time units; and
transmit the RS transmission using the selected subset of antennas during the time unit.

* * * * *